United States Patent Office 2,828,069
Patented Mar. 25, 1958

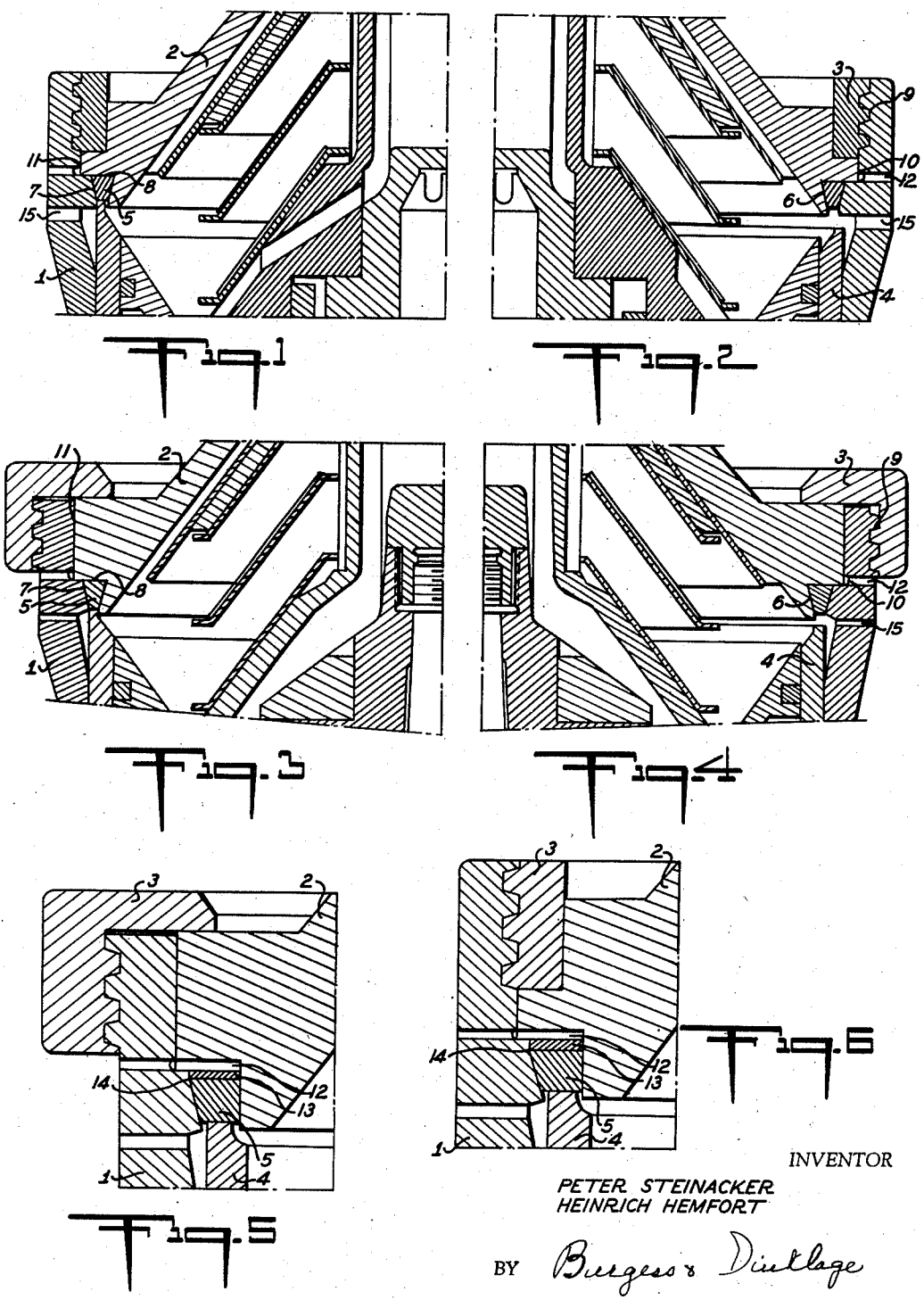

2,828,069

GASKET CONSTRUCTION FOR SLUDGE DISCHARGING CENTRIFUGAL SEPARATORS

Peter Steinacker and Heinrich Hemfort, Oelde, Westphalia, Germany, assignors to Westfalia Separator A. G., a German corporation Application February 8, 1955, Serial No. 486,956

9 Claims. (Cl. 233—46)

This invention relates to an improved gasket construction for sludge discharging centrifugal separators.

The separator bowls of centrifugal separators generally consist of a bowl bottom portion and a bowl cover, which are connected together by means of a locking ring. The sealing together of the two parts is ordinarily effected by providing a gasket ring. The gasket ring is inserted in an annular groove of one of the bowl parts, and the other of the bowl parts is pressed in contact therewith. Centrifugal separator bowls are also known which have a special metal ring to hold the gasket ring.

Sludge discharging centrifugal separators have bowls from which accumulated sludge may be periodically discharged. These centrifugal bowls are provided with peripheral sludge discharge openings and have a sleeve valve axially movable between a position opening the sludge discharge openings and a position sealing the same.

In operation the sleeve valve is normally maintained in a position sealing the sludge discharge openings, so that the sludge accumulates in the bowl. After a certain period of operation and the accumulation of sludge, the sleeve valve is moved to the position in which the sludge discharge openings or ports are open and the sludge is discharged from the bowl therethrough due to the centrifugal pressure.

The movement of the sleeve valve may be effected by the pressure in the centrifugal bowl or may be hydraulically operated as, for example, by providing the valve with an inwardly projecting radial flange and introducing liquid below and/or above the flange to move the sleeve valve in either direction.

In the case of sludge discharging centrifugal separators the gasket used to seal the two parts of the bowl is generally arranged so that the sleeve valve will be pressed in sealing engagement with it when the sleeve valve is in the position sealing the sludge discharge openings. Normally the gasket ring is of circular or square cross section and is positioned opposite the sleeve valve.

As a result of the pressure which the sleeve valve exerts against the gasket ring, which must be relatively large in order to effect dependable sealing, the gasket ring becomes firmly clamped in the annular groove in which it is positioned. During the opening of the sleeve valve, and specifically at the moment that the stress is removed from the gasket, sludge may penetrate into the annular groove holding the gasket ring as the result of the centrifugal pressure. The accumulation of this sludge results in the adhering fast of the gasket in the groove so that when the bowl is taken apart, the ring cannot be removed from the groove without using pointed tools. In this connection, even when taking the utmost care, it is impossible to prevent damage to the ring so that the same must be replaced in order to obtain a proper seal.

In many constructions the locking ring which is used to join the bowl cover to the bowl bottom portion is so arranged that sludge may penetrate into its threads during the sludge discharge operation. During operation this sludge accumulates and dries out so that it is frequently difficult to loosen the locking rings. In such cases excessive force is frequently applied by the operating personnel which may lead to cracks in the material which, although invisible from the outside, can have serious results with respect to dependability in operation.

One object of this invention is a sealing gasket construction for centrifugal bowls of sludge discharging centrifugal separators which avoids the above mentioned disadvantages. This, and still further objects, will become apparent from the following description read in conjunction with the drawing in which:

Fig. 1 is a diagrammatic vertical section of a portion of a bowl of a sludge discharging centrifugal separator showing an embodiment of the gasket construction in accordance with the invention and showing the sleeve valve in the closed position, Fig. 2 shows the opposite side of the portion of the bowl shown in Fig. 1 with the sleeve valve in the open position;

Figs. 3 and 4 are diagrammatic vertical sections of a portion of a sludge discharging centrifugal separator bowl having an external locking ring and an embodiment of the gasket arrangement in accordance with the invention and showing the sleeve valve in the sealed and open position respectively;

Fig. 5 is a diagrammatic partial vertical section showing in detail a further embodiment of the gasket construction in a centrifugal bowl corresponding to that shown in Fig. 3, and Fig. 6 is a diagrammatic section of a portion of a bowl corresponding to that shown in Fig. 1 and showing a further embodiment of the gasket construction.

The invention is applicable to centrifugal separators having a centrifugal bowl comprising a bowl bottom portion and a bowl cover secured together with a locking ring. In this connection the locking ring may be screwed into or over the bowl bottom portion. The bowl has sludge discharge openings defined therethrough and a sleeve valve axially movable between a position opening and a position sealing the sludge discharge openings. The locking ring is positioned on the same axial side of the sludge discharge openings as the bowl cover.

In accordance with the invention an annular groove of substantially trapezoidal cross section which substantially faces in the axial direction of the bottom portion is defined by the lower edge portion of the bowl cover and the adjacent inner surface of the bowl bottom portion. A gasket ring of cross section corresponding to the annular groove is fitted into the groove with one surface thereof in sealing contact with the bowl cover and another surface thereof in sealing contact with the bowl bottom portion. The groove and sleeve valve are so positioned with respect to each other that the edge of the sleeve valve extends into the groove in sealing contact with the gasket ring when the sleeve valve is in the position sealing the sludge discharge openings. The base of the groove is preferably defined by the bowl cover with the base of the gasket ring in sealing contact therewith.

As shown in Figs. 1 and 2, the bottom portion 1 of the centrifugal bowl of a sludge discharging centrifugal separator of conventional construction is connected with the bowl cover 2 by means of the locking ring 3 which is screwed into the bottom portion 1. An annular groove of substantially trapezoidal cross section into which the gasket ring 5 fits is defined by the lower edge portion of the bowl cover 2 and the adjacent inner surface of the bowl bottom portion 7. The base 8 of the annular groove is defined by the bowl cover 2. The bowl cover 2 and thus the annular groove are positioned on the same axial side of the sludge discharge openings 15 as the locking ring 3. Thus, as shown, both the cover portion 2 and the locking ring 3 are positioned above the sludge discharge openings 15.

A gasket ring 5 such as a rubber ring of substantially trapezoidal cross section is fitted in the groove with one surface thereof in contact with the bowl cover and another surface thereof in sealing contact with the bowl bottom portion. As shown, the surface of the gasket adjacent to 7 is in sealing contact with the bowl bottom portion 1 and the base of the gasket is in sealing contact with the surface 8 of the bowl cover. The seal at 7 effects a seal between the bowl bottom portion and the bowl cover while the seal at 8 seals the thread of the locking ring 3 from the passage of sludge, etc., therein.

The groove and the sleeve valve 4 are so positioned with respect to each other that the sleeve valve 4 extends into the groove in sealing contact with the gasket ring when the sleeve valve is in the position sealing the sludge discharge openings, as shown in Fig. 1. The bowl is normally operated in this sealed position and sludge accumulates in the bowl during operation. After a period of operation and accumulation of the sludge, the sleeve valve 4 is moved, as for example by hydraulic actuation in a conventional manner, to the open position shown in Fig. 2 and the centrifugal force in the bowl forces the sludge out through the peripheral sludge discharge openings 15.

The embodiments shown in Figs. 3 and 4 are identical in all respects to those shown in Figs. 1 and 2 respectively, except that the locking ring 3, as shown in Figs. 3 and 4, is screwed over the bowl bottom portion, whereas in Figs. 1 and 2 the same is screwed into the bowl bottom portion.

In assembly, the trapezoidal shaped gasket 5 is laid around the lower edge of the bowl cover and, due to its conical form, provides a good seal with respect to the bowl bottom portion 1. After the bowl is again opened by removal of the locking ring 3, the gasket ring 5 may be removed from the bowl cover without any tools since there is no fixed groove to which the same can bind or adhere. The danger of injury to the ring and the resultant lack of tightness of the bowl is thus eliminated. At the same time, the gasket arrangement in accordance with the invention forms a good seal against the bowl locking ring so that sludge containing liquid can no longer enter the thread.

The ring 5 is preferably so dimensioned in its axial height that the same cannot protrude past the lower edge of the bowl cover, thus eliminating any possibility of deformations occurring during operation of the centrifuge.

In order to prevent the penetration of even the smallest quantities of liquid into the thread 9 of the locking ring an annular channel 10 is defined by the surface 11 of the bowl interior peripherally adjacent to the base of the groove in which the ring 5 is positioned. A number of radially positioned openings 12 are defined through the bowl communicating the exterior of the bowl with the annular channel 10. Any liquid or sludge which thus could possibly leak through the seal at 8 will be collected in the groove 10 and forced by the centrifugal action of the bowl through the openings 12. This prevents any possible penetration of liquid or sludge into the thread 9.

With this construction it is possible that, after a long period of operation, due to the centrifugal force, the edge of the trapezoidal rubber ring 5 might form a ridge or fin penetrating between the bottom portion of the bowl 1 and the bowl cover 2, sealing off these parts so perfectly with respect to each other that any liquid which penetrates behind the gasket ring during the removal of the sludge could not emerge through the bore holes. Liquid which collects in this manner would act with great pressure on the ring due to the centrifugal force and possibly force it out of its groove upon the opening of the discharge port and therefore at the moment when the stress is removed.

In accordance with a preferred embodiment of the invention, as shown in Figs. 5 and 6, this danger is eliminated.

As shown in Fig. 5, a metal ring 13 is secured to the base of the gasket ring 5 as, for example, by being vulcanized thereon. In this manner any possible deformation of the gasket ring to form a fin is eliminated. Additionally, the bores or openings 12 are extended so that they extend over the entire width of the gasket ring. This renders any collection of liquid above the gasket impossible, since the same will be readily forced out through the bores 12 by the centrifugal force.

The metal ring 13 preferably, as shown, extends as a continuation of the gasket ring 5 so that the cross section of these two elements forms a continuous, uninterrupted profile. In certain cases the mere placing of the metal ring over the rubber gasket ring without vulcanization will suffice. Further, if the gasket ring 5 consists of a harder material which will not deform to form a fin, the use of a metal ring may be dispensed with.

The embodiment shown in Fig. 6 corresponds exactly to that shown in Fig. 5, except that the locking ring 3 is screwed into the bottom portion 1, as shown in Fig. 1.

While, as shown, the bowl cover is positioned above the bowl bottom portion, the true relation of these parts will depend upon the position of the bowl and its axis of rotation. Thus, for example, the two parts may, of course, be reversed.

While the invention has been described in detail with reference to the embodiments shown, various modifications, changes in dimensions, etc., will become apparent to the skilled artisan which fall within the spirit of the invention and the scope of the appended claims.

We claim:

1. In a centrifugal separator having a centrifugal bowl comprising a bowl bottom portion and a bowl cover secured together with a locking ring, peripheral sludge discharge openings defined through the bowl and a sleeve valve axially movable between a position opening and a position sealing said sludge discharge openings, said locking ring being positioned on the same axial side of said sludge discharge openings as said cover, the improvement which comprises an annular groove of substantially trapezoidal cross section having the widest portion at the groove base substantially facing in the axial direction of said bottom portion defined by the lower edge portion of said bowl cover and the adjacent inner surface of said bowl bottom portion, a gasket ring of substantially trapezoidal cross section fitted in said groove with one surface thereof in sealing contact with said bowl cover and another surface thereof in sealing contact with said bowl bottom portion, said groove and said sleeve valve being positioned so that the edge of said sleeve valve extends into said groove in sealing contact with said gasket ring when said sleeve valve is in the position of sealing said sludge discharge openings.

2. Improvement according to claim 1, in which the base of said groove is defined by said bowl cover and in which the base of said gasket ring is in sealing contact therewith.

3. Improvement according to claim 2, including an annular channel defined by said bowl peripherally adjacent the base of said groove, and at least one opening defined by said bowl communicating the exterior of the bowl with said annular channel.

4. Improvement according to claim 3, in which said gasket ring has a metal ring secured to its base.

5. Improvement according to claim 4, in which said gasket ring is a rubber ring vulcanized to said metal ring.

6. Improvement according to claim 5, in which a number of openings are defined by said bowl communicating the exterior of the bowl with said annular channel said openings comprising a multiple number of radially positioned bores extending across said metal ring.

7. Improvement according to claim 1, in which said gasket ring has a metal ring secured to its base portion and including an annular channel defined by said bowl peripherally adjacent the base of said groove and at least one opening defined by said bowl communicating the exterior of the bowl with said annular channel and extending across said metal ring.

8. Improvement according to claim 1, including an annular channel defined by said bowl peripherally adjacent the base of said groove and at least one opening defined by said bowl communicating the exterior of the bowl with said annular channel and extending across said gasket ring.

9. Improvement according to claim 8, in which a multiple number of radially positioned openings are defined by said bowl communicating the exterior of the bowl with said annular channel.

References Cited in the file of this patent

UNITED STATES PATENTS

| 2,087,727 | Bath | July 20, 1937 |

FOREIGN PATENTS

| 653,294 | Germany | Nov. 19, 1937 |
| 662,451 | Great Britain | Dec. 5, 1951 |